Dec. 4, 1951        J. R. EVES        2,577,611

DEVICE FOR HARDENING

Filed Jan. 2, 1947        4 Sheets-Sheet 1

INVENTOR
J. ROBERT EVES

BY
*Louis L. Gagnon*
ATTORNEY

Dec. 4, 1951   J. R. EVES   2,577,611
DEVICE FOR HARDENING
Filed Jan. 2, 1947   4 Sheets-Sheet 2

INVENTOR
J. ROBERT EVES
BY
Louis R. Gagnon
ATTORNEY

Dec. 4, 1951   J. R. EVES   2,577,611
DEVICE FOR HARDENING
Filed Jan. 2, 1947   4 Sheets-Sheet 3
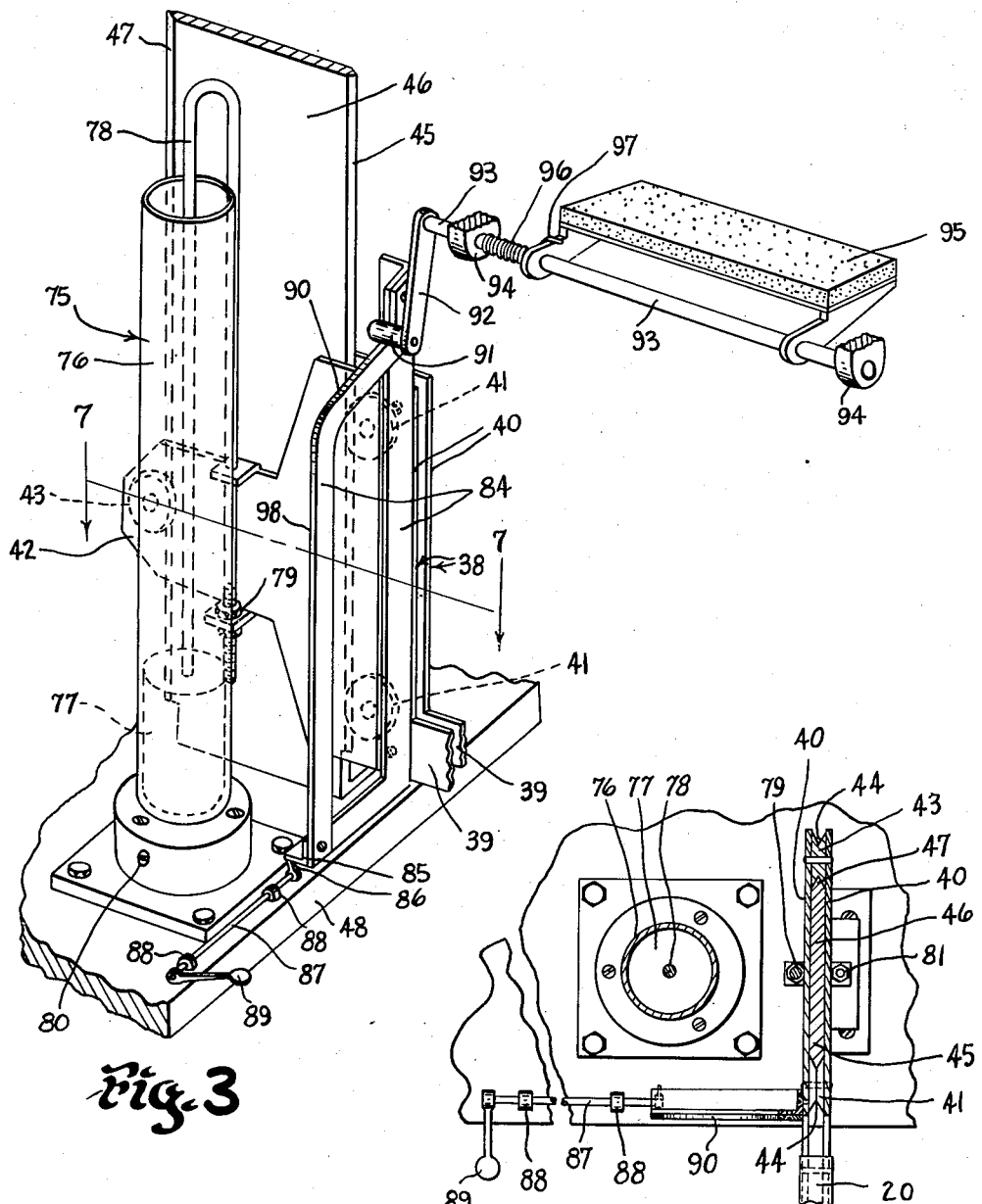
INVENTOR
J. ROBERT EVES
BY
Louis L. Gagnon
ATTORNEY Dec. 4, 1951     J. R. EVES     2,577,611
DEVICE FOR HARDENING
Filed Jan. 2, 1947                                              4 Sheets-Sheet 4
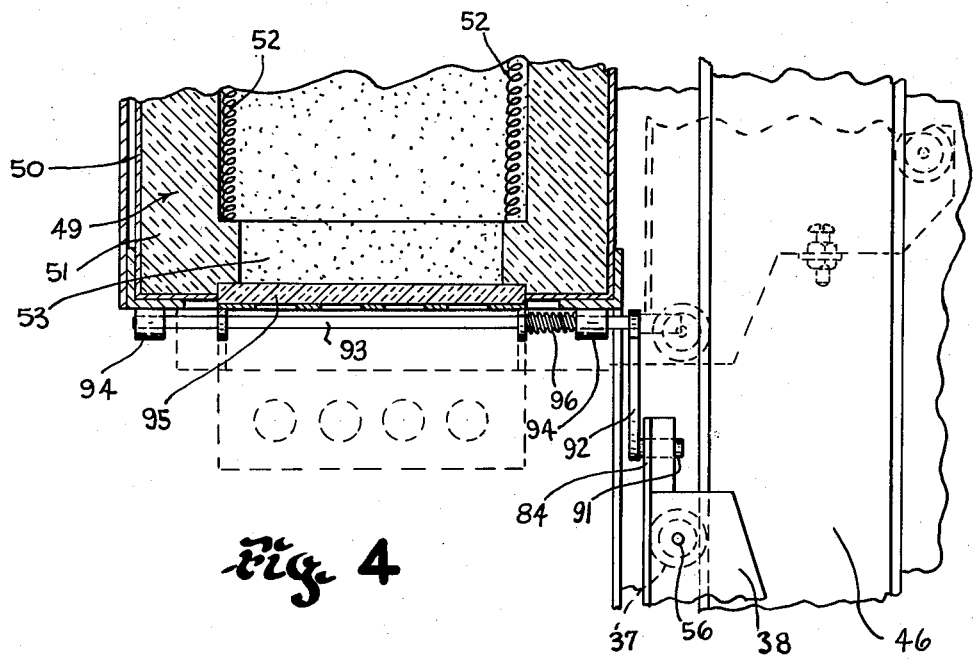
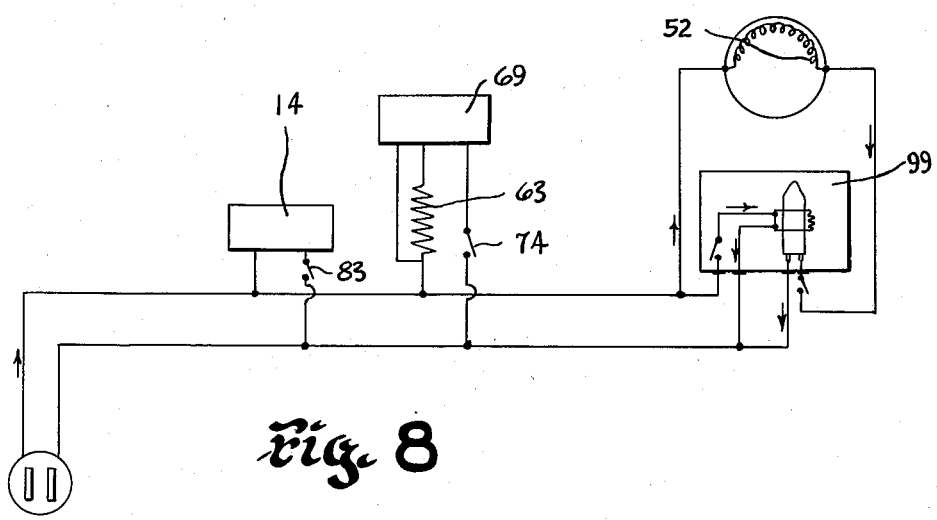
INVENTOR
J. ROBERT EVES
BY
*Louis L. Gagnon*
ATTORNEY Patented Dec. 4, 1951

2,577,611

UNITED STATES PATENT OFFICE 2,577,611

DEVICE FOR HARDENING

Joseph Robert Eves, Southbridge, Mass., assignor to American Optical Company, Southbridge, Mass., a voluntary association of Massachusetts Application January 2, 1947, Serial No. 719,750

9 Claims. (Cl. 49—45)

This invention relates to a device for rendering glass articles more resistant to impact, shock, strains and the like commonly known as a device for hardening or tempering glass articles or sheets, such as ophthalmic lenses or the like and has particular reference to an improved apparatus for accomplishing the above results.

One of the principal objects of the invention is to provide simple, efficient and economical means of rendering glass articles more resistant to impact which will function automatically and which will require little skill and knowledge of such techniques.

Another important object of the invention is to provide a device of the above nature which will embody means for accurately controlling the heat generated within the furnace, means for controlling the position of the article being hardened in said furnace, means for automatically controlling the time interval of heating and means for automatically removing the article from the furnace when heated to the controlled temperature desired and period of time and for subjecting said heated article to chilling influence.

Another object is to provide a simple, efficient and economical means for causing an article of the above character to have a portion thereof in compression and a portion in tension for rendering said article more resistant to impact.

Another object is to provide a holding device for the article to be heat treated which will automatically center and retain said article in desired holding position, regardless of the contour shape of said article both for the position of heating and subsequent cooling.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. It, therefore, is desired not to limit the scope of the invention to the particular details of construction and arrangement of parts shown and described as the preferred form only has been given by way of illustration.

Referring to the drawings:

Fig. 3 is an enlarged fragmentary perspective view having portions thereof shown in section illustrating a portion of the operating mechanism for the lens holding means and door of the furnace;

Fig. 4 is a fragmentary view showing the lower portion of the furnace in section and illustrating a portion of the door operating mechanism of the furnace;

Fig. 7 is a fragmentary sectional view taken on line 7—7 of Fig. 3 and looking in the direction indicated by the arrows; and Fig. 8 is a schematic view giving the electrical wiring diagram of the device.

Figure 1:
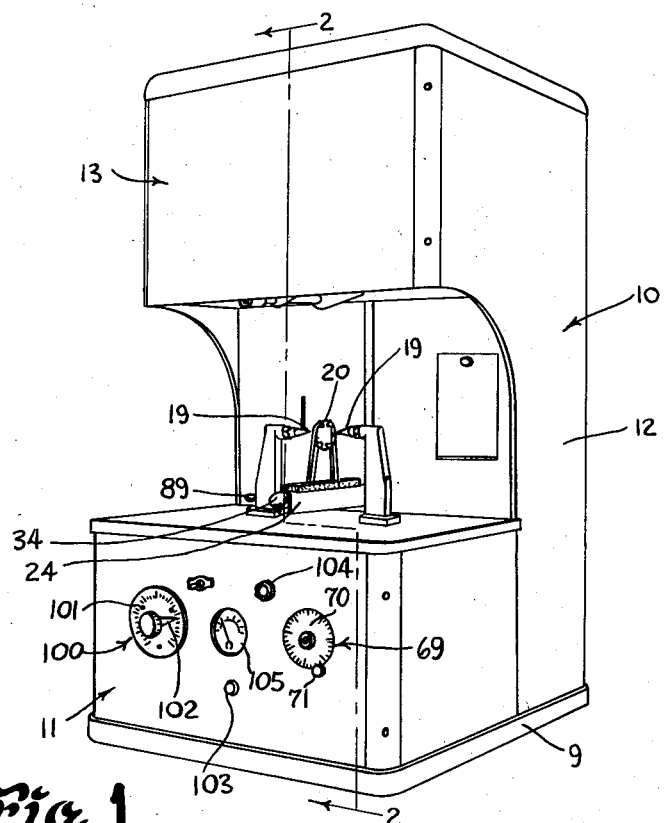
Fig. 1 is a perspective view of the device embodying the invention.
Figure 2:
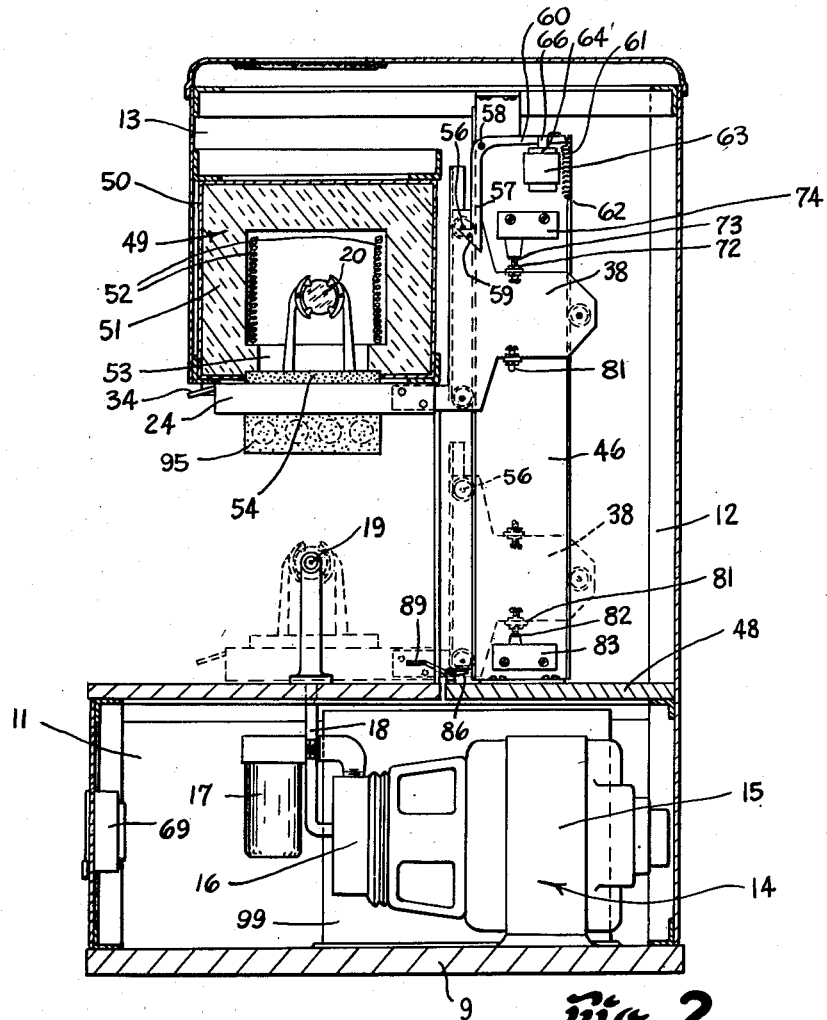
Fig. 2 is a vertical sectional view taken on line 2—2 of Fig. 1 and looking in the direction of the arrows.
Figure 6:
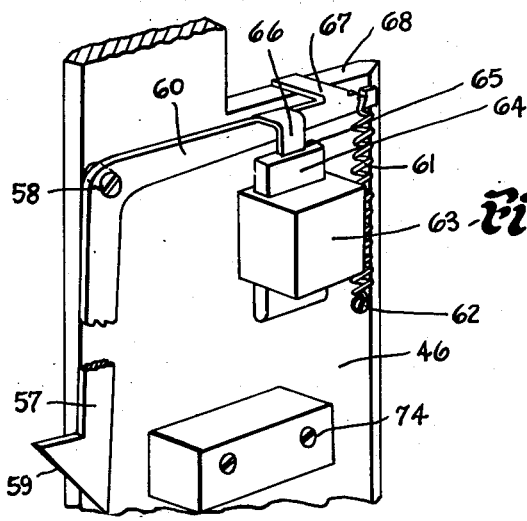
Fig. 6 is an enlarged fragmentary view of the latching mechanism for retaining the holder in raised position and automatically functioning means for moving the latch means to releasing position.

Referring more particularly to the drawings wherein like characters of reference designate like parts throughout the several views, the device embodying the invention as shown particularly in Figs. 1 and 2 comprises a base 9 supporting a housing 10, which housing has a lower hollow compartment 11, an intermediate hollow upright 12 and a hollow upper compartment 13. The lower compartment houses a rotary air compressor unit 14 which is of a standard commercial type embodying a motor 15, a centrifugal blower unit 16 and an air filter 17. The centrifugal blower unit is connected, through suitable pipe lines 18, to a pair of air jets or the like 19. The air jets 19 may be in the form of Venturi nozzles which are adapted to increase the velocity of air directed therethrough.

It is particularly pointed out that the air jets 19 are in spaced aligned relation with each other, as shown best in Fig. 1, and are adapted to afford the positioning of an article 20, to be hardened, tempered or toughened, therebetween. The article 20 is supported between a pair of clamp members 21 carried by spaced uprights 22 which are in turn pivotally connected at 23 to a support 24 mounted on the top of the compartment 11. The clamp members 21 are in the form of a pair of jaws 25 and 26 having spaced grooved ceramic contacts 27 and 28 for engaging the contour edge of the article to be supported thereby. The jaws 25 and 26 are respectively pivoted at 29 and 30 to the uprights 22 so as to have a free movement relative to said uprights about the pivots 29 and 30 as a center.

The lower ends of the uprights 22, intermediate the pivots 23, are provided with interlocking connecting means which in this instance is in the form of a slot 31 formed in one of said members and an interfitting projection 32 formed on the other. The member having the projection 32 thereon has a lever 34 associated therewith by means of which the said member may be rocked on its pivot 23. Compression of the lever 34 tends to move the jaw 25 in an outward direction with respect to the jaw 26 and the interfitting of the connection means 31 and 32 simultaneously imparts a similar movement to the jaw 26 relative to the jaw 25. A spring 35 connected adjacent one of its ends 36 to the support 24 and adjacent its opposed end 37 to the base of the upright 22 tends to retain the jaws normally in adjacent closed relation with each other.

It is particularly pointed out that this type of holding device is self-centering and tends to automatically support the article to be treated in desired centered relation with respect to the nozzles set forth above and in proper heating position as to be described hereinafter. The support 24 while overlying the top of the lower chamber 11 is attached to a vertically disposed slide 38 by two spaced brackets 39 so as to be raised or lowered with said slide.

The slide 38 comprises spaced plates 40 having spaced rollers 41 pivotally connected thereto as illustrated in Fig. 3. The plates 40 have a portion 42 protruding outwardly of one side thereof between which a third roller 43 is pivotally connected. The rollers 41 have a V-shaped peripheral groove 44 therein adapted to engage the bevelled edge 45 of a vertically disposed guide plate 46. The opposed edge of the guide plate 46 is provided with a similarly formed bevel 47 which is engaged by the bevelled groove of the roller 43. The slide plates 40 are thereby free to move upwardly and downwardly of the guide plate 46. The said guide plate 46 is secured to the top plate 48 of the lower compartment 11 particularly that portion of the plate which extends inwardly of the hollow intermediate upright 12, see Fig. 2.

Figure 5:
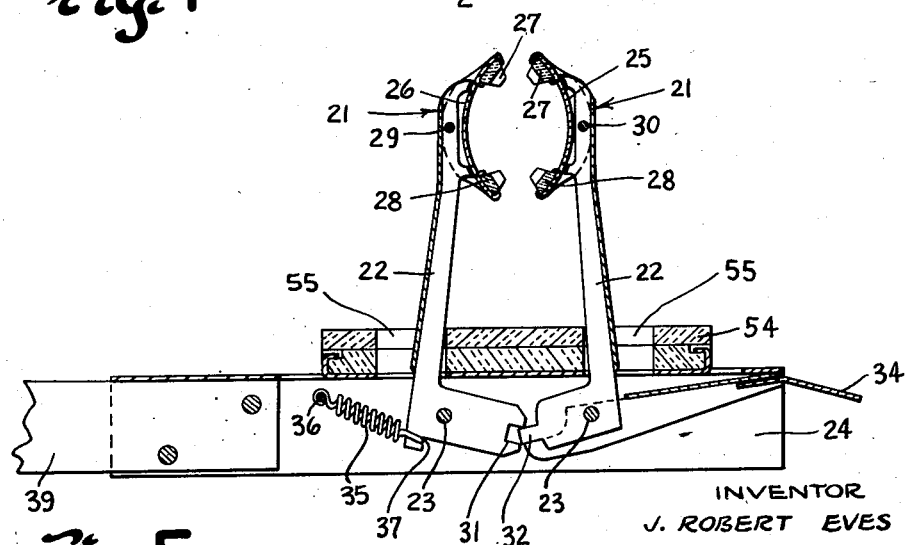
Fig. 5 is an enlarged fragmentary sectional view of the holding device and associated mechanism.

In the compartment 13 there is supported a furnace 49 which may be of the conventional type comprising a metallic housing 50 having insulation material 51 therein and inner resistance heating coils or the like 52. In the bottom of the furnace there is provided a passageway 53 into which the article 20 carried by the holder 21 may be moved. This is brought about by moving the slide 38 upwardly of the guide plate 46 as shown by the full lines in Fig. 2. Adjacent the base of the holder 21 there is provided a plate 54, see Fig. 5, of refractory material having spaced openings 55 therein through which the uprights 22 extend and which is adapted to form closure means for the passageway 53 when the holder is in raised position.

The slide 38 is provided with a pin 56 adapted to be engaged by a latch member 57 which is in turn pivotally connected to the guide plate 46 as illustrated at 58. The latch 57, adjacent the lower end thereof, is provided with a tapered surface 59 which when the slide 38 is being moved to a raised position is adapted to be engaged by the pin 56 to deflect the latch member in an inward sidewise direction about the pivot 58 thereby permitting the pin 56 to move upwardly beneath the holding portion of said latch. The said latch member 57, has an inwardly extending portion 60 to which one end of a coil spring or the like 61 is attached. The opposed end of the coil spring is attached to the guide plate 46 as illustrated at 62. This normally retains the latch member in holding relation with the pin 56. Adjacent the coil spring or the like 61 there is provided a solenoid 63 having a core portion 64 movable in a vertical direction centrally of the solenoid 63. The core 64 is provided with a latch connection portion 65 adapted to be engaged by a latch projection 66 formed integrally with the portion 60 of the latch member. The said portion 60 is provided with an arm 67 disposed in a sidewise direction to the member 66 which is adapted to engage the upper edge 68 of the vertical guide 46 to function as stop means for limiting the inward movement of the end 59.

The solenoid 63, see Fig. 8, is connected to a timing device 69 which is supported by the front wall of the lower compartment 11 as shown in Figs. 1 and 2. The said timing device is of the conventional type embodying means which may be adjusted so as to permit the solenoid 63 to be energized after a predetermined lapse of time. The said timing device is provided with a suitable dial 70 and control knob 71 for facilitating this setting. The function of the timing device 69 and solenoid 63 is as follows: When the slide 38 is moved to its raised position as shown by the full lines in Fig. 2, the said slide 38 38 has an adjustable engagement portion 72 thereon adapted to engage the contact 73 of a microswitch or the like 74, carried by the vertical guide member 46, causing the switch to be tripped and to energize the timer 69 starting the cycle of function of the said timer. After a predetermined interval controlled by the setting of the timer, the said timer will cause the solenoid 63 to be energized. The energizing of the solenoid 63 causes the core 64 to be moved in an upward direction moving the arm 69 of the latch member against the tension of the coil spring 61 and simultaneously causing the latch portion 57 to be disengaged from the pin 56 thereby releasing the slide and causing the holder 21 carried thereby together with the article supported in said holder to move in a downward direction. To cushion the downward movement of the slide 38 and the holder and article carried thereby there is provided an air check device 75. This device comprises a cylinder 76 having a piston 77 mounted to be raised or lowered therein. The piston 77 is carried by an arm 78 which is in turn connected with the slide 38 as shown at 79. It is to be understood that when the slide 38 is in its raised position the piston 77 will also be raised with respect to the cylinder 76 so that downward movement of the slide 38 will cause the piston 77 to simultaneously move downwardly of the cylinder 76. This downward movement of the piston 77 causes an air pressure to be built up inwardly of the cylinder 76 and functions as cushion means for cushioning the downward movement of the slide 38. To provide for a smooth functioning arrangement the said cylinder 76 beneath the piston 77 is provided with an adjustable bleeder valve 80 for controlling the exhaust of the compressed air according to the amount of cushioning desired.

The slide 38, as shown in Figs. 2 and 7, is provided with additional adjustable engagement means 81 which, when the slide 38 is in its lowermost position, is adapted to engage the contact 82 of a microswitch or the like 83 which, as shown in Fig. 8, is electrically connected with the rotary air compressor 14. This energizes the motor 15 causing the said motor to rotate the centrifugal blower unit which in turn forces air through the nozzles 19.

It is to be noted that this downward movement of the slide 38 causes the holder 21 to move downwardly between the nozzles 19 and to automatically move the article into aligned relationship with the nozzles.

This downward movement of the slide 38 moves the engagement member 72 out of contact with the microswitch 74 thereby de-energizing the timing device 69 and also de-energizing the solenoid 63. The said timing device is then again ready to function in a repetitive manner.

The slide member 38, as shown in Fig. 3, has secured thereto an angularly disposed framing 84 having a base plate 85 thereon. The base plate 85 is adapted to be engaged by a cam member 86 carried by a shaft 87. The shaft 87 is journaled in bearings 88 carried by the plate 48 and is operated by means of a hand lever or the like 89. This cam member 86 provides means whereby the slide 38 may be raised to move the engagement means 81 out of contact with the plunger 82 of the switch 83 to deenergize the motor 15 and thereby check the flow of air through the jets 19. This is a manually controlled arrangement by means of which the flow of air may be shut off after the article has been properly chilled.

The framing 84, adjacent the upper end thereof, is provided with a cam portion 90 adapted to engage a roller 91 carried by a crank member 92. The crank member 92 is connected with a shaft 93 journaled in the spaced bearings 94 and to which a door or shutter member 95 is attached. The door 95 is positioned to one side of the passageway 53 and is adapted to swing with the rotation of the shaft 93 to open or closed relation with the passageway. The bearings 94 are carried by the base of the furnace adjacent the passageway 53.

The door or shutter 95 is normally held in closed position relative to the passageway 53 by means of a coil spring or the like 96 having one of its ends anchored in the bearing 94 and the other of its ends 97 latched with the side portion of the door or shutter 95, see Fig. 3. The function of the door is substantially as follows: When the slide 38 and associated holder 21 is in its lowermost position, as shown by the dash lines in Fig. 2, the coil spring 96 is free to hold the door or shutter 95 in closed relation with the passageway 53. When the slide 38 is moved to its raised position, as shown by the full lines in Fig. 2 and by reference to Fig. 3, the cam portion 90 will first engage the roller 91 causing the crank 92 to rotate the shaft 93 and move the door or shutter member 95 to open position. The said shutter or door is held in said open position through the engagement of the cam roller 91 with the vertically disposed edge 98 of the outer portion of the framing 84. This retains the door 95 in open position against the function of the coil spring 96 and thereby permits the holder 21 and the article carried thereby to be moved inwardly of the furnace through the passageway 53. The plate 54 then functions to close the passageway. Upon the movement of the slide 38 to its lowermost position the cam roller will move upwardly of the edge 98 inwardly of the cam portion 90 and will then permit the coil spring to retain the door in closed position.

It has been described above that the furnace 49 is heated by means of suitable resistance coils 52. In electrical connection therewith is provided a suitable controller 99 for regulating and maintaining the temperature of heat in the furnace at a controllable uniform temperature. In hardening glass articles, best results are achieved when the variation of temperature in the furnace can be kept within a minimum range during the actual heating of the article. In this respect, the potentiometer type controller 99 has proven most satisfactory, although, of course, any of the other conventional controllers could be used. Through the use of a potentiometer type controller, applicant has been able to maintain temperature differentials within the limit of plus or minus 1°. The controller 99 is provided with a suitable setting device 100 supported on the front wall of the lower compartment 11. The setting device 100 embodies a temperature scale 101 and an indicator 102. A pilot light 103 or other suitable means is also associated with the furnace to indicate when it has been saturated with heat to the temperature for which controller 99 has been set. In said heating system, there is also provided a rheostat 104 and galvanometer 105 which operate in the conventional manner.

In utilizing the device to harden a lens or other glass article, the operator must first determine the average thickness of the lens. From this dimension, he computes the time interval for which the lens is to be heated, based, of course, on the temperature at which the furnace is being run. Obviously, the higher the temperature in the furnace, the shorter will be the period of treatment. In keeping with the objects of the invention, a chart is preferably prepared for use with the device wherein time intervals of heating as based on different temperature have been worked out for the usual thicknesses of lenses encountered. This will both speed up the operation and reduce the chances of error in calculation.

Thus, the operator adjusts the control setting switch 100 and timer 69 according to the values found on the chart for the particular thickness of lens to be hardened. When the furnace is completely saturated with heat to the desired temperature, as indicated by pilot light 103, the lens is placed between the clamp members 21 of the holding device and manually raised by the handle 34 into the furnace. The door to entrance 53 automatically opens to permit the insertion of the holder and automatically closes upon its removal. When the holder has been raised into the furnace, it is automatically held therein by the latch 57 and the timing device 69 is simultaneously started. At the end of the time cycle, the timing device energizes the solenoid 63 causing the core 64 to rise and delatch the holder. The holder immediately drops under the action of gravity with the air check device 75 cushioning its fall and causing the holder to be moved to its initial position between the air jets 19. As the holder reaches its position between the air jets, the engagement portion 81 carried by slide member 38 contacts plunger 82 of microswitch 83, starting the air compressor unit 14. Cooling blasts of air are thereupon directed through jets 19 onto the opposed side surfaces of the lens. When the lens has been sufficiently chilled, the contact between engagement portion 81 and plunger 82 may be broken by depressing lever 89. This de-energizes and therefore shuts off the rotary air compressor. The lens is then removed from the holder by depressing handle 34 and the hardening unit is ready for repeating the process.

From the foregoing, it is believed that exceedingly simple and efficient means and method have been provided for accomplishing all of the objects and advantages of the invention.

Having described my invention, I claim:

1. A device of the character described comprising a heating chamber having an entrance opening thereto, cooling means spaced from said entrance opening to the heating chamber, and a work holder movable to and from a pair of positions, one of said positions being so located as to cause work carried by the work holder to be supported so as to be chillable by the cooling means, and the second of said positions being so located as to cause the work to be held in the heating chamber, said work holder having an engageable portion, and supporting means adjacent said second position for releasably engaging said portion of the work holder when in said second position to overcome a force tending to urge the work holder to return to the first position, control means for disengaging said supporting means from the engageable portion of the work holder upon elapse of a predeterminable interval of time to allow said force to return the work holder to said first position, said control means being operable by movement of the work holder into said second position where the work is held in the heating chamber.

2. A device of the character described comprising a heating chamber having an entrance opening thereto, jet means spaced from said entrance opening to the heating chamber, and a work holder movable to and from a pair of positions, one of said positions being so located as to cause work carried by the work holder to be supported in alignment with the jet means, and the second of said positions being so located as to cause the work to be held in the heating chamber, said work holder having an engageable portion, and a movable latch member adjacent said second position adapted to be moved into place to engage said engageable portion of the work holder so as to cause the work holder when in said second position to resist a force tending to urge the work holder to return to the first position, control means energizable by a source of electrical energy for moving said latch member to a position where it will cease to engage said portion of the work holder upon elapse of a predeterminable interval of time whereby said force will cause the work holder to return to its first position, and switch means for energizing said control means, said switch means being operable by movement of the work holder to said second position where the work is held in the heating chamber.

3. A device of the character described comprising a heating chamber having an entrance opening in a wall portion thereof, closure means pivotally connected adjacent said wall for closing said entrance opening and spring actuated means for normally urging said closure means in closed relation over said entrance opening, a cooling unit in spaced relation to said entrance opening, and a work holder mounted for movement from a position in the cooling unit to a position in the heating chamber, cam means carried by said work holder and a cam follower carried by the closure means, said cam follower engaging the periphery of the cam means, and with said cam means being of such a peripheral shape as to cause the cam follower to pivot the closure means into an open position about its pivotal axis as the work holder is moved toward the entrance opening to the heating chamber and sufficiently to permit the work holder to pass through said entrance opening.

4. A device of the character described comprising a heating chamber having an entrance opening in a wall portion thereof, a closure member adjustably mounted on said wall and spring actuated means for normally urging said closure member into closed relation over the entrance opening in said wall, a cooling unit spaced from said entrance opening, and a work supporting member mounted for movement from a position in the cooling unit to a position in the heating chamber, cam means carried by one of said members and a cam follower carried by the other member, said cam follower engaging the periphery of the cam means, and with the periphery of said cam means being of such shape as to cause the closure member to be moved by cooperation with the cam follower into an open position as the work supporting member is moved toward the entrance opening to the heating chamber and sufficiently to permit the work supporting member to pass through said entrance opening.

5. A hardening device of the character described comprising a heating unit and a chilling unit in spaced relation, a work holder, and means for restricting said work holder to a course of movement between a pair of stations, one of said stations being so located that work held thereby is positioned to be chilled by the chilling unit and the other station being so located that said work held thereby is positioned to be heated by the heating unit, and latch means for maintaining the work holder at said latter station where the work is positioned to be heated, said work holder having a contact portion, and switch means positioned adjacent said latter station to be contacted by said contact portion of the work holder when moved to said station, said switch means being adapted on contact by the contact portion of the work holder to cause the latch means to unlatch the work holder at the end of a predeterminable period of time whereby the work holder will be returned to the first station to position the work to be chilled by the chilling means.

6. A hardening device of the character described comprising a heating chamber and jet means spaced therefrom through which chilling gases are adapted to flow, a work holder, and means for restricting said work holder to a course of movement between a pair of stations, one of said stations being so located that work held thereby is positioned in alignment with the jet means and the other station being so located that said work held thereby is disposed in the heating chamber, latch means for maintaining the work holder at said latter station, and a pair of switch means adjacent each end of said course of movement, each adapted to be operated by movement of said work holder to a respective station adjacent said ends, the switch means adjacent said latter station being adapted to cause the latch means to unlatch the work holder at the end of a predeterminable period of time whereby the work held by the holder will be removed from the heating chamber and the holder returned to the first station where the work will be aligned with the jet means, said jet means being controlled by the switch means adjacent the other end of the course to cause chilling gases to flow through the jet means when the work is aligned therewith.

7. A hardening device of the character described comprising jet means through which chilling gases are adapted to flow and a heating chamber spaced in overlying relation therewith, a work holder, and means for restricting said work holder to a course of movement between a lower and an upper station, the lower station being so located that work held thereby is positioned in alignment with the jet means and the upper station being so located that said work held thereby is disposed in the heating chamber, latch means for maintaining the work holder at said upper station, and a pair of switch means adjacent each end of said course of movement, each adapted to be operated by movement of said work holder to a respective station adjacent said ends, the switch means adjacent said upper station being adapted to cause the latch means to unlatch the work holder at the end of a predeterminable period of time to cause the holder to return to the first station where the work will be aligned with the jet means, said jet means being controlled by the switch means adjacent the other end of the course to cause chilling gases to flow through the jet means when the work is aligned therewith.

8. A hardening device of the character described comprising a heating chamber and jet means spaced therefrom through which chilling gases are adapted to flow, a work holder having contact means thereon, means for restricting said work holder to a course of movement between a pair of stations, one of said stations being so located that work held thereby is positioned in alignment with the jet means and the other station being so located that said work held thereby is disposed in the heating chamber, latch means for maintaining the work holder at said latter station, and a pair of switch means adjacent each end of said course of movement, each adapted to be operated by the contact means of said work holder when said holder is positioned at the station adjacent said respective ends, the switch means adjacent said latter station being adapted to cause the latch means to unlatch the work holder at the end of a predeterminable period of time whereby the work held by the holder will be removed from the heating chamber and the holder returned to the first station where the work will be aligned with the jet means, said jet means being controlled by operation of the switch means adjacent the other end of the course to cause chilling gases to flow through the jet means when the work is aligned therewith.

9. A hardening device of the character described comprising a chilling unit and a heating unit in spaced aligned relation, a movable work holder for supporting work in cooperative relation with said respective units, guide means restricting the movement of the work holder to a course between a pair of stations, one station being located so that the work may be positioned in cooperative relation with the heating unit and the second station being located so that the work may be positioned in cooperative relation with the chilling unit, restraining means for maintaining the work holder at said first station against a force urging the work holder to move to the second station, releasing means actable on said restraining means to free the work holder for movement by said force to the second station, a timing device rendered operative with the movement of the work holder to said first station where the work held thereby is positioned in cooperative relation with the heating unit, said timing device being cooperatively connected with the releasing means and adapted to cause said releasing means to act upon elapse of a determinable period of time as controlled by said timing device whereby automatically the work is released to move into cooperative relation with the chilling unit, and said timing device being adjustable whereby the period of time during which the work is held in cooperative relation with the heating unit may be controlled according to the characteristics of the work being treated.

J. ROBERT EVES.

REFERENCES CITED

The following references are of record in the file of this patent:

UNITED STATES PATENTS

| Number | Name | Date |
|---|---|---|
| 233,672 | Haley | Oct. 26, 1880 |
| 1,776,823 | Summey | Sept. 30, 1930 |
| 2,166,348 | Ford | July 18, 1939 |
| 2,409,284 | Jackson | Oct. 15, 1946 |